United States Patent
Elliott et al.

(10) Patent No.: US 7,320,125 B2
(45) Date of Patent: Jan. 15, 2008

(54) PROGRAM EXECUTION STACK SIGNATURES

(75) Inventors: Scott Clementson Elliott, Hillsboro, OR (US); Kenneth A. Gengler, Portland, OR (US)

(73) Assignee: Techtracker, Inc., Portland, OR (US)

( * ) Notice: Subject to any disclaimer, the term of this patent is extended or adjusted under 35 U.S.C. 154(b) by 925 days.

(21) Appl. No.: 10/155,825

(22) Filed: May 23, 2002

(65) Prior Publication Data

US 2003/0005414 A1  Jan. 2, 2003

Related U.S. Application Data

(60) Provisional application No. 60/293,864, filed on May 24, 2001.

(51) Int. Cl.
    *G06F 9/44* (2006.01)
(52) U.S. Cl. .............. 717/131; 717/133; 717/124; 714/38; 714/45
(58) Field of Classification Search ........ 717/124–135; 714/44–47, 38
See application file for complete search history.

(56) References Cited

U.S. PATENT DOCUMENTS

| 5,243,607 | A | * | 9/1993 | Masson et al. ............. 714/49 |
| 5,761,407 | A | | 6/1998 | Benson et al. .......... 395/183.13 |
| 5,974,529 | A | * | 10/1999 | Zumkehr et al. ............. 712/41 |
| 6,009,258 | A | | 12/1999 | Elliott ................... 395/500.43 |
| 6,163,858 | A | | 12/2000 | Bodamer ..................... 714/34 |
| 6,349,406 | B1 | | 2/2002 | Levine et al. .................. 717/9 |
| 6,658,416 | B1 | * | 12/2003 | Hussain et al. ............... 707/10 |
| 6,662,358 | B1 | * | 12/2003 | Berry et al. ................. 717/128 |
| 2002/0013825 | A1 | * | 1/2002 | Freivald et al. ............. 709/218 |
| 2003/0154464 | A1 | * | 8/2003 | Ullmann et al. ............ 717/130 |

OTHER PUBLICATIONS

"Stack Trace Filters," no date, http://web.archive.org/web/20021028144510/http://www.softwareverify.com/memoryValidator/mernval_filtering.html.*

"Java Tip 124: Trace Your Steps in Java 1.4," by John D. Mitchell, Mar. 8, 2002, published on the Internet at <http://www.javaworld.com/javatips/jw-javatip124_p.html,> pp. 1-8, copyright 2002 by JavaWorld.com.

"Stack Trace Exceptions in Win32," by Dr. Carlo Pescio, published in C/C++ Users Journal, vol. 16, No. 6, Jun. 1998, published on the Internet at <http://www.eptacom.net/pubblicazioni/pub_eng/except.html,> pp. 1-5.

"Stack Trace Assertions Using COFF," published in C/C++ Users Journal, Jun. 1997, published on the Internet at <http://www.eptacom.net/pubblicazioni/pub_eng/assert.html,> pp. 1-7.

PCT International Search Report dated Sep. 25, 2002 for International Application No. PCT/US02/16526.

* cited by examiner

*Primary Examiner*—Lewis A. Bullock, Jr.
(74) *Attorney, Agent, or Firm*—Stoel Rives LLP

(57) ABSTRACT

A digital computer call stack or combined call stack and data stack is traced and analyzed following the occurrence of an unhandled exception or crash. Stack frame sizes and other artifacts are used to form a distinctive stack signature that generally reflects execution of the program up to the point of failure, without being finely detailed. Stack signatures can be associated with program bugs, and stack signatures collected from other failure instances, at other times or on other machines, can be conveniently compared for recognizing particular types of failures, without access to source code and without detailed study of memory dumps.

10 Claims, 3 Drawing Sheets

PROGRAM EXECUTION STACK SIGNATURES

RELATED APPLICATIONS

This application is a continuation of and claims priority from U.S. Provisional Application No. 60/293,864 filed May 24, 2001. The provisional application is incorporated herein by this reference.

COPYRIGHT NOTICE

© 2002 TechTracker.com, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This invention pertains to operation of digital computers and, in particular, to the creation, collection and use of information associated with unhandled exceptions caused by one or more "bugs" in an executable program.

BACKGROUND OF THE INVENTION

Unfortunately, computer programs "crash" all too often, usually for reasons that are not apparent. Despite extensive testing during development, beta testing, bug reporting procedures and the like, the reality is that even relatively mature software often contains "bugs"—the popular term for a flaw in the program code. Bugs are constantly being discovered, reported, collected, analyzed and in many cases fixed in a subsequent release, update or patch to the code. Still, in many application programs, especially complicated programs such as word processors, bugs remain that in some situations can cause a program to "crash"—the vernacular term for an unhandled exception. In other words, these are situations where an exception has occurred during execution of a program, and there is no exception handler code registered to deal with the exception. The result is that the program simply stops executing—it has crashed.

The typical response to a mysterious program crash (remonstrations aside), is to restart the failed program, and attempt to recover the user's data, sometimes by means of a backup file. Restarting the program, however, necessarily changes the state of the computer such that information about the state when the crash occurred is lost. That information might have been useful in identifying the bug that caused the crash.

Indeed, it is known in prior art to capture machine state information for use in debugging a program, or otherwise attempting to determine the cause of a crash. When a program stops executing (abnormally), this fact can be recognized and used to trigger a capture of the machine state. The current contents of RAM, processor registers, stack contents, etc. can be stored for later analysis. Sometimes an experienced, skilled artisan can study this information, like a detective at a crime scene, and discern something about the cause of the mishap. It is a difficult and labor intensive undertaking.

In the event of another crash of the same program, perhaps at another time or on another computer, there is no convenient way to determine whether the second crash might have the same or a similar etiology as the first. The detailed state of the second machine (or the same machine at the time of the second crash) will likely be quite different from the state at the time of the first crash. Only another painstaking, detailed study of the machine state might reveal some association with the first crash. At the other extreme, it would be easy, for example, to record the program's instruction pointer value at the time of a crash, and then compare that value at the time of the second crash to see if the address is the same. This method would fail if a program's instructions were loaded at different addresses, and it is utterly context-insensitive. Even though it identifies the location where the program was executing instructions, it is unaffected by how the program got there.

Most methods concentrate on describing the crash in ways that could be meaningful to diagnose it, but ignore the usefulness of concisely characterizing it so that crash events can be categorized, collated, and studied statistically. This is not intended to aid in diagnosis per se, but it certainly could help manage such tasks. If a particular "bug" could be distinguished as being widespread, for example, it might warrant more attention than another. For this purpose, a precise description of the actual failure is not necessarily desirable. Commonly, programs crash because they tried to access a memory address that did not exist, an attribute too vague to aid categorization. Such crashes often occur within faultless code operating on defective data, so that even the actual location of the failure could be misleading.

What is needed is a way to identify or characterize a program crash, or more specifically, the current state of a computer thread at the time of a crash, that is easy to determine and recognize. It would be especially useful to have a way to describe that state so that a programmer could programmatically recognize a meaningfully similar state, whether it occurs on the same computer, a different computer, or even within a completely different program. A method that could generically characterize the instantaneous state of a thread at any arbitrary time would be more than adequate for this need, since it could therefore characterize the state of any crashed thread. It could, further, characterize the state of other non-crashed threads in the same program or other programs on the same machine, if desired for further study.

The invention endeavors to digest the call and/or data stack of an arbitrary program thread in order to generate a signature that characterizes its present state, sensitive to the path by which it reached its present state. The execution stack signature that this procedure generates is not required to concretely describe any aspect of the thread or its stack; rather the signature provides a moniker or alias that is predictably-similar when it describes threads in similar states and predictably-different when it describes threads in different states.

SUMMARY OF THE INVENTION

One aspect of the present invention is a method and computer program implementation for capturing and describing a program's state as precisely or as generally as may be required for a particular application. For example, it may be too vague to be useful to report merely that a word processor crashed when the user inserted a page break. There may be many other circumstances that would help to distinguish or identify the particular failure. On the other hand, a complete "core dump" (to borrow an old term) would provide so much detailed information that virtually no other crash will "match" that information.

The present invention includes the concept of a "stack signature" that is not unduly precise, yet provides an abstract indication of a program thread's current state at the time of a crash, or any arbitrary time, and how it arrived there. The "stack" is a well-known feature of most von Neumann architecture computers. There can be more than one stack, and stacks can be variously implemented in hardware registers, RAM, etc.

In one embodiment of the present invention, the stack signature is derived from the entire stack, so that it reflects at least at a high level, the control flow from the start of execution of the program of interest. It is not itself a correlation technique, but a transformation whose output can be subjected to correlation techniques, both common established methods and experimental ones. It therefore enables the use of a wide range of study and examination to which a crash or other event is not intrinsically applicable. The stack signature can be simple enough for even an untrained observer to "match" or correlate one stack signature with another by inspection. For longer or more complex signatures, various correlation techniques can be used for matching or categorizing signatures.

Another important aspect of the invention is that the stack signature methodology is versatile enough that the level of precision can be adjusted even after the signature has been recorded. The primary method calls for tracing the program's call-stack and/or data-stack, and collecting a pattern of chosen metrics, which can include, for example, the sizes of stack frames, specific return addresses, or the general identity of the code to which those addresses belong. For example, an address can be associated with particular library. This type of information—what library was called—is an example of a "broad brush" picture of program flow; it reflects something useful about program flow, but is not unduly detailed.

Word processing programs are just one example of a type of application program that is widely used and complex enough to contain bugs that can cause the program to crash unexpectedly. The present invention is applicable to all kinds of computer programs that are executable on a von Neumann type of processor platform that implements a stack architecture. One common example of such a platform is Intel's x-86 series of processors and their progeny, e.g. Pentium® microprocessors, etc.

Additional aspects and advantages of this invention will be apparent from the following detailed description of preferred embodiments thereof, which proceeds with reference to the accompanying drawings.

BRIEF DESCRIPTION OF THE DRAWINGS

FIG. 4 is a first example of a stack frame signature.

FIG. 5 is a second example of a stack frame signature.

FIG. 6 is a third example of a stack frame signature.

FIG. 7 is a fourth example of a stack frame signature.

Figure 1:
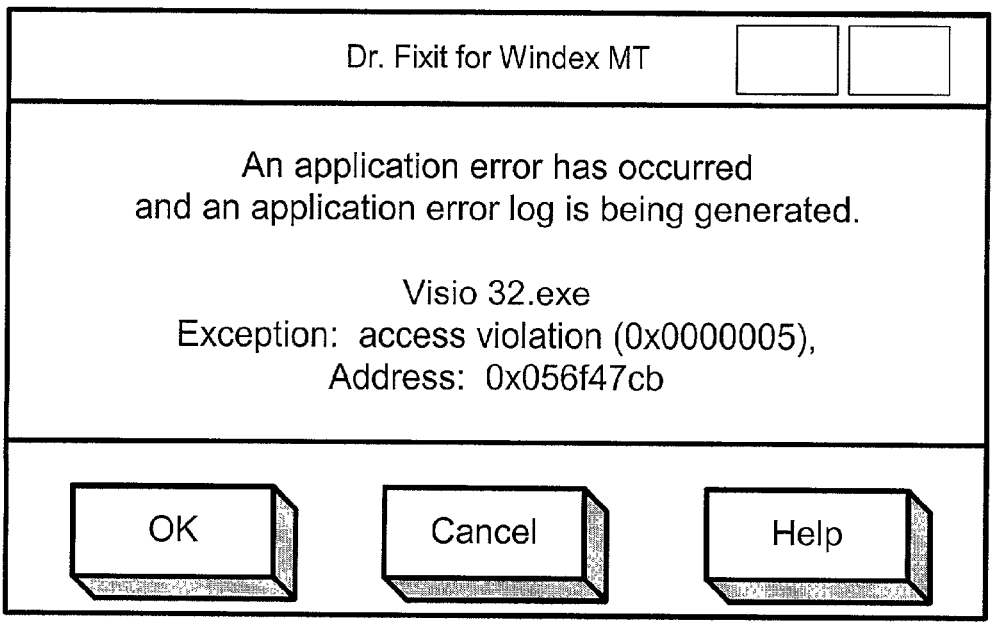
FIG. 1 is an example of an error message resulting from abnormal termination of an application program apparently due to an unhandled exception.

DETAILED DESCRIPTION OF PREFERRED
EMBODIMENTS

We want to distinguish the states that an arbitrary program thread might be in when various types of failures occur. We would benefit from the ability to characterize the state of a program's threads in general, as this would enable us to do so when a program failure occurs.

Put another way, we want to be able to recognize a failure as being (probably) the same failure mode or due to the same bug when it occurs on another run or another machine. But specific state is too specific; it will never match.

Program stacks are well known in computer science. A common type of stack is the call stack. A call stack generally holds a return address for returning to the calling program after the called program (or function, driver, module etc.) has completed its work, as well as a saved copy of the calling program's base pointer—i.e., a pointer to the first or "base" location on the stack associated with the calling program. The call stack can also be used to pass parameters to the calling program as is well known.

Some systems refer to the stack as beginning at the "top" and expanding "down" toward the "bottom" as more entries are pushed onto the stack. Others have the stack beginning initially at the "bottom" and expanding upward as more items are pushed onto the stack. Thus the bottom of the stack is fixed and the top of the stack moves up and down. The "current top of stack" is the next location above the last entry made (or reserved) by the currently executing module. This convention will be used in the present description, as well as the drawing figures and the appended claims. The stack convention is arbitrary, however, and the present invention is not limited to application in any particular platform or environment.

Figure 2:
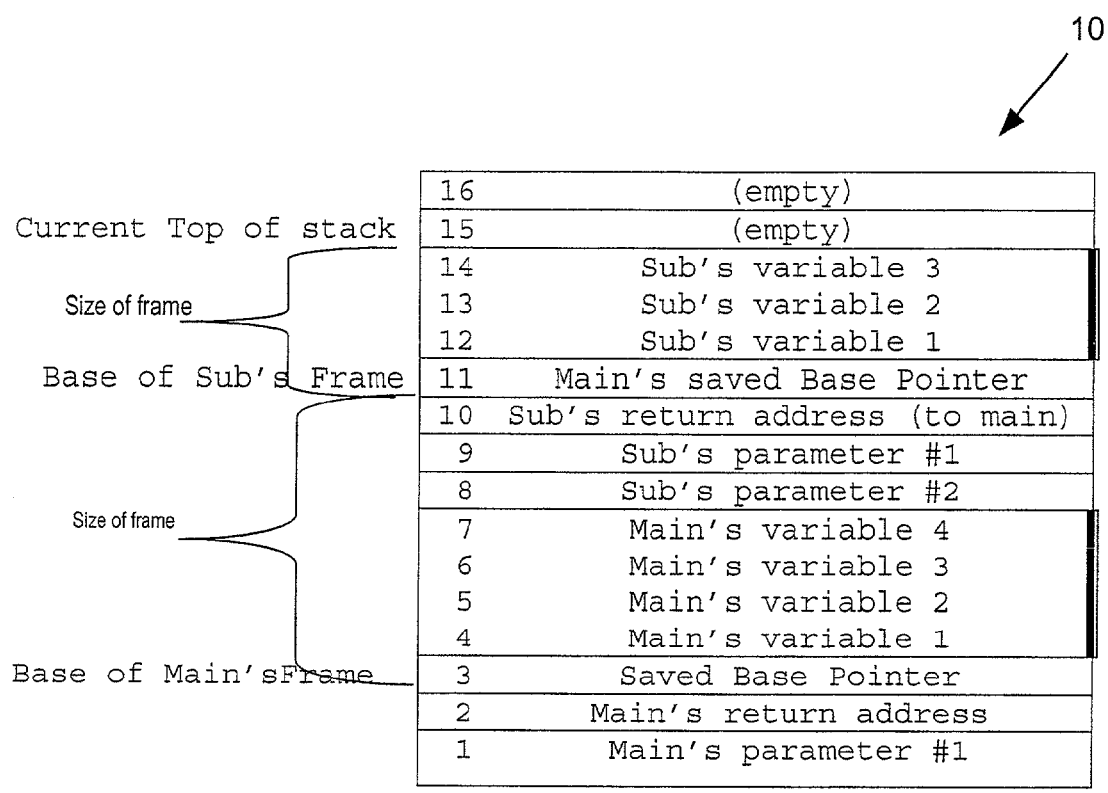
FIG. 2 is a first example of a map of a combined call stack and data stack.

Some machines also implement one or more data stacks, typically used for temporary storage of intermediate data or results. The program simply "pushes" such data onto the stack as convenient, and "pops" it off when needed. This approach is customarily used where the number of available hardware registers is quite limited, as in some microprocessors and microcontrollers. Commonly, however, the call and data stacks are combined into a single stack, as illustrated in FIG. 2. The present invention compiles metrics from whatever stack or stacks are present, as its primary goal find attributes that are predictably consistent for a particular path of execution.

Stacks can be implemented in various ways, e.g. using hardware registers, random access memory, etc. Details of stack implementation are well known and beyond the scope of the present invention. The principles of the invention are applicable to virtually any stack implementation as will become more apparent below.

Often an unhandled exception results in a screen display message of the type shown in FIG. 1—sometimes called the "dreaded box of death." While the type of exception—in this example an access violation—and the address where it occurred may be useful to a developer in some cases, it says nothing about how the execution arrived at this unfortunate state. (It has also been suggested that the content of such messages is almost useless by definition, because if the operating system had useful information about the crash, it would remedy the situation.)

The present invention is directed in part to capturing more context surrounding the crash, so that other crashes might be recognized as having occurred under the same or a similar context. This recognition, in turn, at least suggests that the "matching" crash might be a result of the same bug that caused the first crash (or something similar).

To achieve this, the principal goal of the invention is to produce a signature by tracing the thread's stack, accumulating metrics which are predictably-consistent artifacts of the program's behavior. These artifacts needn't be deliberate, nor is it necessary that they be individually distinctive.

Accumulating these metrics together in combination establishes the uniqueness of each signature, and the uniqueness is made more robust if it is sensitive to the ordering of these metrics.

One simple metric that yields robust signatures is the distance between adjacent stack frames (essentially the "size" of each frame). A typical program function declares a stack frame for itself immediately upon being invoked, always declaring as much space as it might need. While this quantity is doubtless not individually unique, it is consistent for every invocation of that particular function, and so it meets our criteria and helps form a robust signature by accumulation.

The representation of the signature offers opportunities for enhancement. If we will only be interested in exact matches, we could form a signature by simply appending the metrics together and hashing it to form a fixed-length checksum; this method would be about as robust as the chosen hashing function, which could be as simple as a CRC32 or as sophisticated as a SHA-1. To enable more sophisticated analysis, we can transform the ordered list into a string. There exist many elaborate and powerful string-collation and analysis techniques, and this transformation would enable us to exploit them instead of devising our own.

Referring now to FIG. 2, a simple example of a combined stack 10 is shown, extending over locations 1 to 16. This type of arrangement is similar to that found in an Intel platform, for example, where the Intel CPU has a register called the Extended Base Pointer ("EBP") that points to the current top of the stack. In the Intel stack, the top element contains the EBP for the previous stack frame. Referring again to FIG. 2, starting from the top of the stack, a first frame is employed by function "Sub." The first frame extends from location 14 to location 11. Location 11 saves the previous or calling function's (here, "Main") base pointer.

The top of the next frame is location 10; it stores the return address provided by the calling program Main. This second frame extends from location 10 to location 3, where it stores a saved base pointer. Location 2 has Main's return address and so on. The first and second stack frames (measured from the top) are 4 and 8 cells apart, respectively. The distance between one stack frame and the next is the sum of all the items pushed onto the stack between nested function calls. A simple way to describe this stack, or portion of a stack, is an ordered list, in this case "4-8" indicating two adjacent frames, having sizes 4 and 8 respectively. Enclosing the string in delimiters, like parentheses, permits the ends of the stack to be clearly denoted. For this example, the string would then read "(4-8)." The same principle is easily applied to a program with more and larger stack frames. For example, such an ordered list might be "(280-312-242-4-728-449-233-18-385)." These kinds of ordered lists are examples of stack frame signatures in accordance with the present invention. As the reader can see, these are relatively easy to create and to compare to one another. Stack frame signatures are not limited to a list of frame sizes. Additional information can be useful, but what is important here is to be sensitive to attributes influenced by the thread's execution path yet insensitive to other influences like the contents of specific variables, quantity of free memory, or the current date & time. To illustrate, a stack trace can be used to collect return addresses, but that specific information is excessively precise for present purposes. The same program, executing at another time or on another machine, may load program modules at arbitrarily different locations so that the program may not traverse the same addresses even if it executes the same sequence of instructions. Consequently, a stack frame signature comprising return addresses will likely not find a match, even when comparing runs that executed completely identical paths of instructions. Similarly, recording the value of the instruction pointer at the time of failure will not help where instructions are loaded at different addresses, and in any event, this value is unaffected by how the program arrived there; it provides no historical context.

Return addresses, however, can be used to identify a module (library, executable, or other code file) to which the calling code belongs. The actual numerical addresses are ephemeral, again because each time the program is loaded, those numbers may change. Module locations may change or they simply might not be known at a later time. But the address is meaningful at the time of its discovery because it refers to a location, probably a code module, at which the program eventually expected to continue execution. It can consequently be used to identify the module to which that address refers. This can be obtained, for example in Microsoft Windows OS, by a system call, providing the address as an argument. The identity or type of module can be used to determine whether or not to include the metrics of a particular frame (call) in a stack frame signature. If we do not want our signature to sense differences solely attributable to different versions of the operating system, for example, we could first identify each module as described above, and censor from the signature any information associated with modules provided by the operating system. This is optional, though, as it is just as valid to regard as significant all attributes of all frames.

To illustrate, FIG. 4 shows a simple stack frame signature. The parentheses delimit the ends of the stack. In this example, the frame sizes are encoded using base 36 simply to make the data structure more compact and easier to inspect. Nine frames are represented. Next we compare the frame signature of FIG. 5 to that of FIG. 4. Assume that these signatures reflect crashes of the same application program on two different computers. The two signatures are identical except for the fourth symbol, which has the value "14" in FIG. 4 and 5 in FIG. 5. If it were determined, for example, that the fourth symbol (frame) was a call to a video board, the difference in frame sizes might be attributed to the software on the two video boards, which may be from different vendors. That frame size has nothing to do with the application program under study. So by identifying the general type or library of a given module, one can choose whether or not to include it in the frame signature. Here, where we want to recognize similar failure modes of the application program, omission of the fourth symbol would leave signatures that match. That symbol (frame size) could simply be omitted from the signature; or it could be replaced by a generic symbol, as a frame place holder that would allow the signatures to match.

In other situations, it may be useful for categorizing failures to know the identity or type of module called in each frame. This information can be included in the frame signature. For example, suppose there are code libraries A, B and C loaded. A stack frame signature can be constructed as illustrated in FIG. 7 where each symbol, indicating the corresponding frame size, also includes another symbol, here the superscripts "A" and "C," indicating the corresponding module library. The symbols without superscripts can indicate calls to functions within the application program under study. The reader will by now appreciate that such signatures can easily be compared and examined to identify patterns or common characteristics.

FIG. 6 illustrates additional features and potential applications of stack frame signatures. Here, a portion (substring) 72 of the signature matches a substring of the signature of FIG. 5. In the case of FIG. 5, the program crashed at the end of that string, in the frame having length "N" (assuming the signature string runs from bottom to top of stack). In FIG. 6, the same substring 72 appears, but the program continued to execute thereafter (for another dozen frames). More user data, in other words signatures of scores or even hundreds of other crashes of the same program can be compared to help determine the implications of this difference. For example, if 98% of a larger sample of signatures match the substring of FIG. 5 but not the longer signature of FIG. 6 different conclusions may be drawn.

FIG. 6 also illustrates other features. First, the connector between the symbols H and 7, i.e., the equal sign, differs from the other connectors and is used here to signify a break in the stack trace or stack frame chain. This is further discussed below. The other notable feature of FIG. 6 is the repeating sequence "C-24-C-24-C-24" etc. This type of repeating pattern can reflect a program logic loop or a recursion failure mode in which a module keeps calling itself recursively, and declaring more stack space, until it runs out of space. Such patterns are easy to recognize and to match.

FIG. 4 is a flow chart illustrating a method of forming a frame stack signature associated with a particular program thread in accordance with the invention. Referring to FIG. 4, the method begins at step 42 where the present invention is invoked. It can be called at any time to capture a stack frame signature. One way to implement the invention is as an enhancement to a pre-existing "debugger" program. Alternatively, it can be implemented stand-alone or integrated with other tools. In a presently preferred embodiment, the invention is implemented in executable code, and it is registered with the target operating system so that the operating system will launch the stack signature program ("SSP") responsive to abnormal termination of an application program. In step 44, the SSP finds the stack pointer, indicating the current top of stack. Next it finds the base pointer in the current frame, step 46, which can be done using known stack trace methods. From these pointers, or similar stack trace tools, the size of the current stack is determined in step 48. This datum can form the first item in the signature as illustrated above.

Other metrics are captured, optionally, in step 50. These can include, for example, the current frame module name, type or library. Indicia responsive to such additional metrics can be included in the signature data. As mentioned above, such further metrics can also be used to modify or filter the signature data, for example with regard to calls to drivers or other modules that may be irrelevant for present purposes.

Referring again to FIG. 4, step 52 calls for tracing the next frame, by which we mean at least locating the next base pointer. In decision block 54 we check whether the next base pointer is valid. For example, does it point to another location on the stack (valid), or does it contain zero or point somewhere else (invalid). If it is valid, test for end of stack 56, and if true, return 60.

If the next base pointer is invalid at test 54, there is a break in the chain of stack frames. This can occur, for example, where a function call did not adhere to standard or customary programming practices with regard to the stack. The present method will then single step to the next stack location (proceeding top to bottom in this illustration), step 64, and test 66 whether that location contains a valid base pointer. If not, we single step to the next location, loop 67, and so on until we find the next valid pointer. That defines the next frame for present purposes, and we determine its size in step 68. Again, other metrics about this frame can be captured as well, step 70, such as the identity of its library or the general type of function. Still referring to FIG. 4, we again test for end-of-stack, step 72, and if true return 60. If this is not the bottom frame in the stack, we loop back to continue to process, preferably until we parse through the entire stack.

Of course, some stacks may be quite long. This is not necessarily a problem, and long signatures can be used, but the relevance of lower (older) frames in a long stack with regard to the ultimate failure of the subject program may be attenuated or null. Accordingly, one could choose to truncate a stack frame signature to some arbitrary length, at the risk of losing some potentially useful information. Whatever method is employed to truncate, it must be predictable so that the truncation of identical signatures does not yield differing results. A simple, effective method would be to retain fixed-length excerpts of the starting and ending portions of the signature, two areas likely to be of interest. If we intend to employ the signature to test only for exact matches, we could hash it to a fixed-length checksum, so that the significance of the length of the intermediate data is how it impacts the final checksum.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A method of assessing a computer program under actual working conditions comprising the steps of:
   executing the computer program multiple times under actual working conditions;
   in response to each unhandled exception encountered during execution of the computer program, creating a corresponding stack frame signature to characterize the state of the program;
   comparing the stack frame signatures to determine which unhandled exceptions are likely to have resulted from similar features;
   wherein said comparing the stack frame signatures includes identifying at least one category of stack frame signatures based on a common attribute; and
   updating the computer program responsive to the identified at least one category of stack frame signatures so as to reduce an occurrence of future unhandled exceptions.

2. A method of assessing a computer program according to claim 1 wherein the common attribute is that the stack frame signatures are identical.

3. A method of assessing a computer program according to claim 1 wherein the common attribute is that each of the stack frame signatures reflects a series of frames having correspondingly equal sizes.

4. A method of assessing a computer program according to claim 1 wherein the common attribute is an identical substring.

5. A method of assessing a computer program under actual working conditions comprising the steps of:
   executing the computer program multiple times under actual working conditions;

in response to each unhandled exception encountered during execution of the computer program, creating a corresponding stack frame signature to characterize the state of the program;

comparing the stack frame signatures to determine which unhandled exceptions are likely to have resulted from similar features;

wherein said comparing the stack frame signatures includes searching for a matching substring; and updating the computer program responsive the matching substring so as to reduce an occurrence of future unhandled exceptions.

6. A method of assessing a computer program under actual working conditions comprising the steps of:

executing the computer program multiple times under actual working conditions;

in response to each unhandled exception encountered during execution of the computer program, creating a corresponding stack frame signature to characterize the state of the program; and comparing the stack frame signatures to determine which unhandled exceptions are likely to have resulted from similar features;

wherein said comparing the stack frame signatures includes first filtering the stack frame signatures so as to remove indicia of certain predetermined types of calls.

7. A method of assessing a computer program according to claim 6 wherein said types of calls include driver calls.

8. A machine-readable medium on which are stored computer program instructions for assessing a computer program under actual working conditions, the computer program instructions comprising:

first code for executing the computer program multiple times under actual working conditions;

in response to each unhandled exception encountered during execution of the computer program, second code for creating a corresponding stack frame signature to characterize the state of the program; and third code for comparing the stack frame signatures to determine which unhandled exceptions are likely to have resulted from similar features;

wherein said comparing the stack frame signatures includes identifying at least one category of stack frame signatures based on a common attribute.

9. A machine-readable medium on which are stored computer program instructions for assessing a computer program under actual working conditions, the computer program instructions comprising:

first code for executing the computer program multiple times under actual working conditions;

in response to each unhandled exception encountered during execution of the computer program, second code for creating a corresponding stack frame signature to characterize the state of the program; and third code for comparing the stack frame signatures to determine which unhandled exceptions are likely to have resulted from similar features;

wherein said comparing the stack frame signatures includes searching for a matching substring.

10. A machine-readable medium on which are stored computer program instructions for assessing a computer program under actual working conditions, the computer program instructions comprising:

first code for executing the computer program multiple times under actual working conditions;

in response to each unhandled exception encountered during execution of the computer program, second code for creating a corresponding stack frame signature to characterize the state of the program; and third code for comparing the stack frame signatures to determine which unhandled exceptions are likely to have resulted from similar features;

wherein said comparing the stack frame signatures includes first filtering the stack frame signatures so as to remove indicia of certain predetermined types of calls.

* * * * *

UNITED STATES PATENT AND TRADEMARK OFFICE
CERTIFICATE OF CORRECTION

| | | |
|---|---|---|
| PATENT NO. | : 7,320,125 B2 | Page 1 of 1 |
| APPLICATION NO. | : 10/155825 | |
| DATED | : January 15, 2008 | |
| INVENTOR(S) | : Scott Clementson Elliott and Kenneth A. Gengler | |

Figure 3:
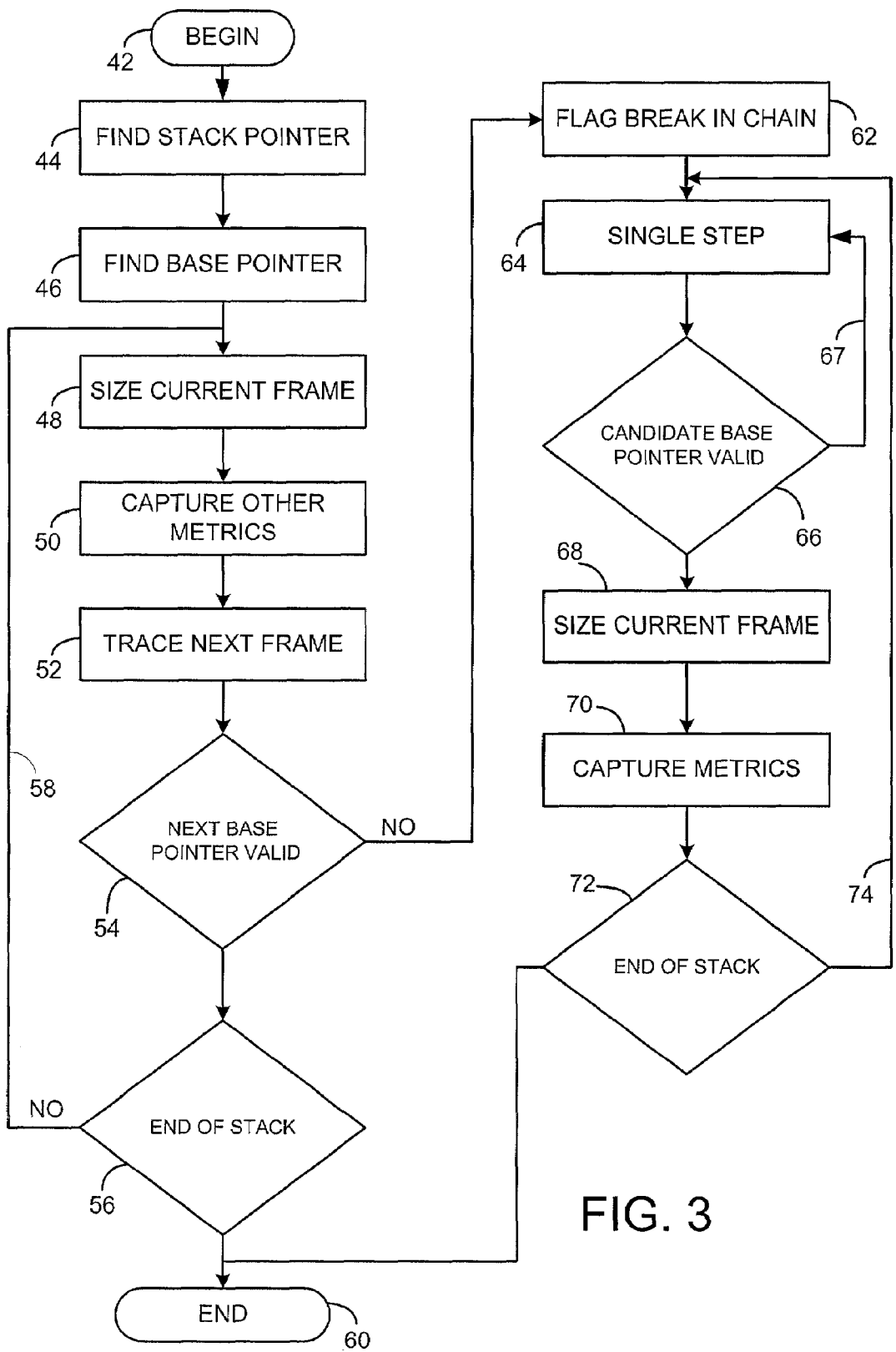
FIG. 3 is a flow chart illustrating a method of generating a stack frame signature.

It is certified that error appears in the above-identified patent and that said Letters Patent is hereby corrected as shown below:

In Column 7, line 26, please change "FIG. 4" to --FIG. 3--.

In Column 7, line 28, please change "FIG. 4" to --FIG. 3--.

In Column 7, line 53, please change "FIG. 4" to --FIG. 3--.

In Column 8, line 5, please change "FIG. 4" to --FIG. 3--.

In Column 9, line 10, after "responsive", please insert --to--.

Signed and Sealed this

Twenty-third Day of September, 2008

JON W. DUDAS
*Director of the United States Patent and Trademark Office*